United States Patent [19]

de Loye et al.

[11] 4,027,337
[45] May 31, 1977

[54] INSTALLATION FOR THE REMOTE TRANSMISSION OF FACSIMILES

[75] Inventors: Martin de Loye, Paris; Michel Béduchaud, Villebon-sur-Yvette, both of France

[73] Assignee: Compagnie Industrielle des Telecommunications Cit-Alcatel, Paris, France

[22] Filed: Aug. 6, 1975

[21] Appl. No.: 602,517

[30] Foreign Application Priority Data
Aug. 9, 1974 France .................. 74.27730

[52] U.S. Cl. .................. 360/73; 179/15 BV; 358/258
[51] Int. Cl.² .......................... G11B 15/46
[58] Field of Search ........ 178/DIG. 23; 179/15 BV; 360/73, 74

[56] References Cited
UNITED STATES PATENTS

| | | | |
|---|---|---|---|
| 3,691,314 | 9/1972 | De Bell et al. | 360/73 |
| 3,692,942 | 9/1972 | Inose et al. | 179/15 BV |
| 3,811,008 | 5/1974 | Lee | 178/DIG. 23 |
| 3,865,987 | 2/1975 | Yamamoto et al. | 360/73 |
| 3,900,887 | 8/1975 | Soga et al. | 178/DIG. 23 |

Primary Examiner—Glen R. Swann, III

[57] ABSTRACT

Installation for the remote transmission of facsimiles, comprising a telecopy transmitter device connected by a telephone line to a telecopy receiver device and comprising two buffer memories adapting the transmission speed of the line to that of the transmitter and to that of the receiver respectively. The buffer memories are each constituted by a multi-track magnetic tape driven by a motor controlled by a time base having high stability; the buffer memory on the receiver side comprises, moreover, an electronic assembly, between the magnetic tape and the telecopy receiver device, intended for compensating short-term changes in speed of the tapes.

7 Claims, 6 Drawing Figures

INSTALLATION FOR THE REMOTE TRANSMISSION OF FACSIMILES

FIELD OF THE INVENTION

This invention relates to facsimile transmission apparatus, and in particular to devices for the reproduction of documents notably to copying or tele-copying devices enabling the direct reproduction or distant reproduction of documents. It concerns more particularly, in these devices, a memory for images enabling an image to be registered in digital form.

BACKGROUND

It is known that the transmission of facsimile signals, over a telephone line, towards a receiver necessitates the use of a buffer-memory loaded by the facsimile signals coded in digital form when the out-put rate of the transmitter or receiver terminal is greater than the permissible flow-rate for the transmission line. The buffer-memory is unloaded so as to allow the transmission of coded facsimile signals over the line under optimum conditions for the transmission lines. The role of the buffer-memory is thus essentially to match the transmission speed of the line to the scanning speed of the document by the transmitter equipment, or the transmission speed of the line to the reproduction speed of the document by the receiver equipment.

In known transmitter equipment, with the scanning speed of a document greater than the speed of transmission over the line, a load-unload control member of the buffer-memory transmits a signal which interrupts the analysis of the document until the memory is sufficiently unloaded to allow the analysis of the document to be continued. This equipment operates by the scanning of successive lines of the document. A synchronisation term is coded and transmitted with the facsimile signals to distinguish the successive scanning lines of the document, this synchronisation term differing from the coded facsimile signals so that it is not confused with them and can be easily separated from them in the receiving equipment.

In the known equipment, these buffer-memories are generally constituted by MOS memories (shift registers). The signals given by the analysis of successive lines of a document are received by these memories which easily allow the speed of analysis to be matched to the speed of transmission along the line, or the speed of reproduction to the speed of transmission along the line, at the receiving end. However the resulting memory circuits are very burdensome and voluminous.

In other know equipment, the buffer-memory which matches the speed of scanning of a document, or the speed of reproduction of a document, to the speed of transmission of data between the emitter and receiver, can be constituted by a magnetic tape recorder. The totality of the data to be transmitted, or which has been transmitted, can be recorded on the magnetic tape. The drive of the magnetic tape at a variable speed during recording and play-back, allows the speed of transmission of the data to be matched to the bandwidth of the channel used, thus rendering independent the speeds of analysis or reproduction of a document from the speed of transmission over a distance of the information.

It is also known, in such equipment making use of an intermediate recording of data on magnetic tape, to associate two auxiliary memories with each magnetic tape which at the transmission end are arranged up-stream of the magnetic tape, and at the receiving end down-stream of the magnetic tape. The pair of memories associated with magnetic tape are alternatively loaded and unloaded, the magnetic tape having an intermittent stop-start drive. For example at the transmission end one of the memories is loaded by the data coming from the analysis at the frequency of the analysis; when it is full the information from the analysis loads the second memory while the contents of the first memory are transferred to the magnetic tape thus driven. When the first memory is empty, the tape stops. The tape is again driven for the transfer of the contents of the second memory when this is full, then stops when it is empty, and during this last transfer the first memory is again loaded and the transfer process continues until the complete recording of the data on the magnetic tape.

Where a signal is recorded in binary code, on magnetic tape, it is also known to associate a synchronisation signal with this signal which can be recorded on auxiliary track.

SUMMARY OF THE INVENTION

According to the present invention there is provided an apparatus for facsimile transmission comprising a transmitter assembly providing a signal of binary data to be transmitted over a distance, a receiver assembly providing an image from a signal of binary control data and a transmission line between the assemblies, comprising, in the transmitter and receiver assemblies respectively, a first and second buffer-memory using a multi-track recording tape, for matching the rates of the binary data signal to be transmitted and the binary data control signal to the rate of transmission of the line; and comprising furthermore, in said second buffer-memory a compensation device for the fluctuations of drive speed of the tape, said compensation device comprising means for recording clock pulses provided by the receiver assembly on one track of the tape, called pilot track, at the rate of recording of data on the tape, three auxiliary memories for memorising data corresponding to an image block or image line, switching assemblies connected to respective inputs of the auxiliary memories, and a control circuit for the switching assemblies for defining from the rate of producing an image block in the receiver assembly, a cyclic operation of each of the auxiliary memories succussively in a write mode at the rate of clock pulses read on the pilot track for the memorising of the data read on the tape, in a recirculation mode at the rate of clock pulses of production of successive points of the image for the putting in phase of the recorded data, and in a read mode at the rate of the clock pulses of production of successive points of the image for the control of the constitution of this image, one of the auxiliary memories operating in the write mode while a second operates in the recirculation mode and while the third operates in the read mode.

BRIEF DESCRIPTION OF THE DRAWING

The invention will now be described in more detail, by way of example only, with reference to the accompanying drawings, in which.

DETAILED DESCRIPTION

Figure 1:
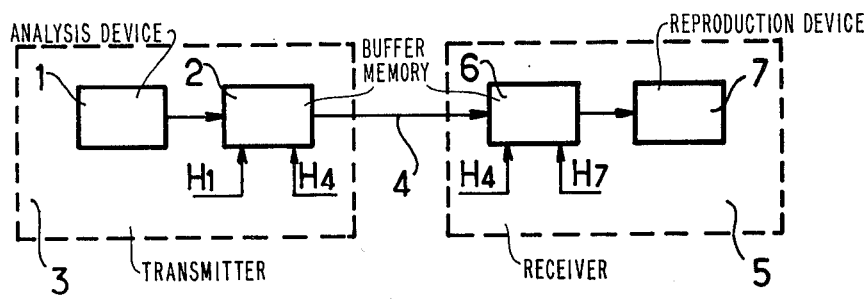
FIG. 1 is a diagram illustrating the link between a transmitter and receiver using a telephone line in a known manner, allowing the known function of the buffer-memories used to be explained more clearly.

In FIG. 1 an analysis device 1 is shown providing electrical signals resulting from the analysis of the document. These sampled signals are converted into coded facsimile signals in digital form, i.e. into a series of signals having levels 0 and 1. These coded facsimile signals are received in a first buffer-memory 2 associated with the device 1. The device 1 and the first buffer-memory 2 constitute a transmitter assembly 3 connected by a telephone line 4 to a receiver assembly 5 analogous to the preceding assembly 3 and comprisng a second buffer-memory 6 and a device 7 for the reproduction of the document.

During operation, the first buffer-memory 2 is loaded at the rate at which the coded facsimile signals are produced by the analysis device 1 under the control of clock pulses H1 giving the rate of sampling in the transmitter assembly. This memory 2 is unloaded at the rate of transmission of bits over the line 4, under the control of clock pulses H4 giving the rate of transmission of the bits over the line. The second buffer-memory 6 is loaded at the rate of transmission of the line 4 (pulses H4); it unloaded at the rate of writing of the reproduction equipment of document 7, under the control of clock pulses H7 which have the same frequency as the pulses H1 for the identical transmitter-receiver assemblies 3 and 5.

The image memory, corresponding to each of the preceding elements 2 and 6, is in particular intended to add to a copier-telecopier device. This memory is intended to allow the recording to the entire image of a document to be transmitted and to allow the speed of operation of an equipment terminal (transmitter or receiver) to be matched to the speed of transmission over the line, even if these speeds are markedly different. In the particular application envisaged, for a transmission over a telephone line having a capacity of 1200 bauds; this ratio is in the order of 36 for an analysis or reproduction of a document in a copier-telecopier with a speed close to 43200 bits per second.

Figure 2:
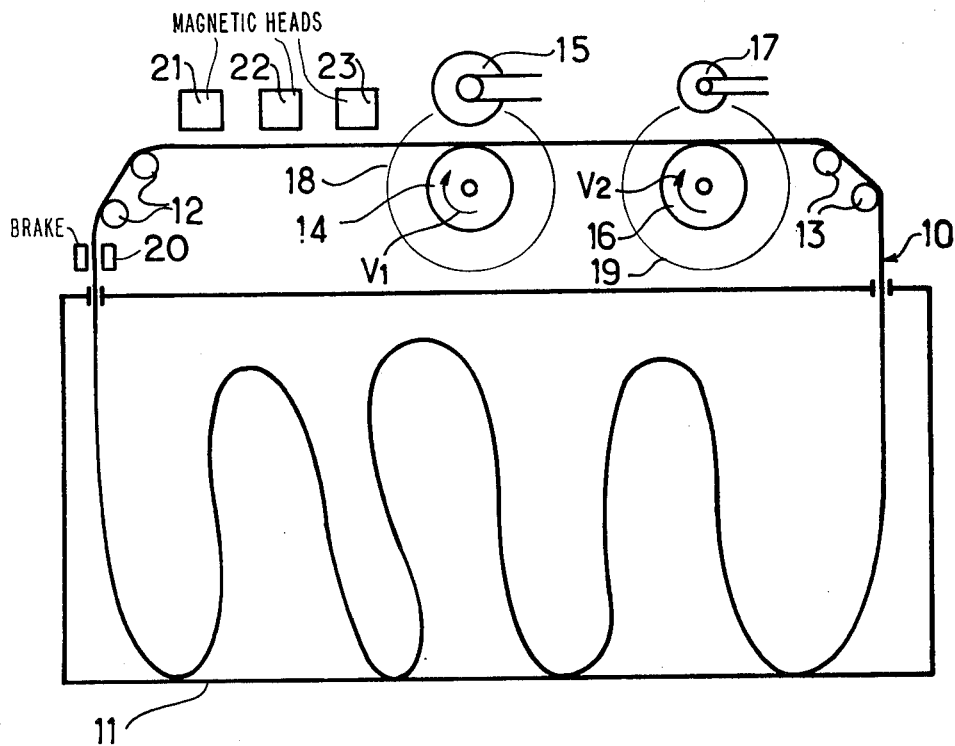
FIG. 2 illustrates a type of buffer-memory used in the invention.

In FIG. 2, an embodiment of a buffer-memory corresponding to the element 2 of FIG. 1 is shown. The buffer-memory 2 is constituted by an endless magnetic tape 10. The magnetic tape 10 forms a free loop inside a cassette 11 which allows it to have, from the mechanical point of view, a low inertia. The magnetic tape 10 outside the cassette 11 passes over guides such as 12 and 13.

The drive of the magnetic tape 10 is produced by a first capstan 14 associated with a first pinch wheel 15 or by a second capstan 16 associated with a second pinch wheel 17. The capstans 14 and 16 are driven as shown by the associated arrows, at different speeds, V1 and V2, allowing the ratio of the analysis and writing speeds of the transmission line to be complied with. The capstans 14 and 16 are driven by a motor (not shown) controlled by a quartz time-base, as is known in the cinematographic field to ensure the synchronisation between the recording of images and sound. This method of driving the capstans 14 and 16 allows any long-term drift of the image recorded on the magnetic tape 10 to be avoided, while maintaining a very stable long term drive speed.

Each of the capstans 14 or 16 is furthermore mounted on a flywheel 18 or 19 allowing instantaneous fluctuations in speed to be reduced. It will, however, be noted that the instantaneous variations in speed which occur are not compensated by means of a feedback system acting on the drive motor, such variations being compensated electronically as will be seen hereafter, by referring to FIG. 4, before reproduction of the document.

A brake 20 allows the magnetic tape 10 to be rapidly slowed down during the changing of the drive speed, for example during the passage from the fast to the slow speed.

The magnetic tape 10, thus driven, passes near magnetic heads; a magnetic erase head 21, a magnetic writing head 22, and a magnetic reading head 23. As is well known in this field the writing head 22 is excited by the coded facsimile signals which are applied to it for the recording of the facsimile image on the magnetic tape; the erase head 21 excited during the operation of the writing head 22 ensures the erasing of any preceding recording on the tape. The reading head 22 is excited by the data recorded on the tape with a view to its transmission when it is engaged after the writing operation.

The magnetic tape 10 is a multi-track tape having at least one coded fac-simile recording track and one magnetic track known as the pilot track on which the control clock is recorded. The tape 10 shown in FIG. 3 relates to the transmitter 3, but the tape at the receiver 5 is identical. According to the example shown in the FIG. 3, the tape 10 is provided with three magnetic tracks 25, 26, 27 intended for the recording of the coded facsimile signal and a fourth magnetic track 28, known as the pilot track, on which a clock is recorded at the same time as the bits of the coded facsimile signal of the image. Four magnetic writing heads 22a to 22d are associated with the magnetic tape 10, four magnetic reading heads 23a to 23d, and four magnetic erase heads (not shown) are also arranged facing the four tracks 25 to 28. The successive bits of the coded facsimile signal are applied respectively to three magnetic heads 22a to 22c intended for their recording through a multiplexer 29 controlled by clock pulses H1. The multiplexer 29 is shown as three switching devices 29a to 29c which are closed one after the other by the clock pulses H1. The clock pulses, here H1, provided by the analysis equipment 1 and defining its analysis rate are also applied to the magnetic head 22d for the pilot track 28 and are thus recorded, simultaneously with facsimile signal bits on the other tracks. The coded facsimile signal is thus multiplexed on three tracks 25 to 27 which allow a magnetic track 10 of reduced length to be used and also the drive speed of the tape to be reduced by a factor of three relative to the case where a magnetic tape with a single signal coded facsimile recordng track is used.

The bits multiplexed during recording are in a similar manner de-multiplexed during reading of the multi-track magnetic tape 10. The reading heads 23a to 23c are connected through a de-multiplexer 30 identical to the preceding multiplexer 29. The demultiplexer 30 is controlled at the rate H'4 at the same frequency as the transmission frequency of the line 4, these pules H'4 are read on the track by the reading head 23d. In practise a single multiplexer-de-multiplexer controlled at the rate H1 or H'4 is associated with the reading and writing heads 22 and 23, the operations of reading and writing being carried out one after the other but not simultaneously.

Figure 3:
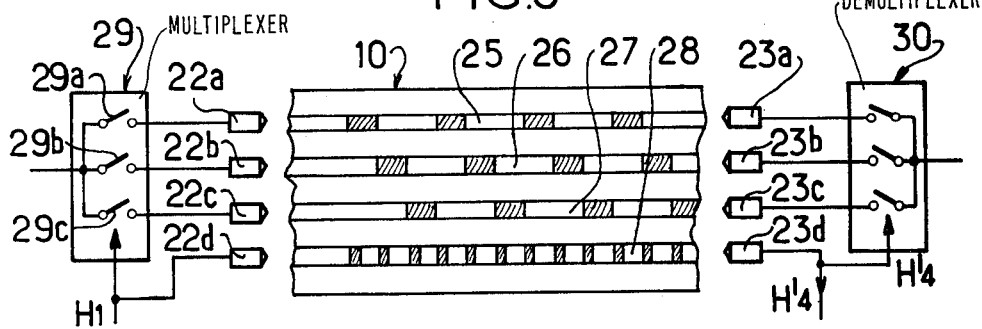
FIG. 3 illustrates the manner of registering the signal in the memory according to FIG. 2.

The buffer-memory of the receiver assembly 5 of FIG. 1 comprises a magnetic tape identical to that described in FIGS. 2 and 3. For the recording of the coded facsimile signal from the line 4, a multiplexing of the bits is carried out at the rate H4; the clock pulses H4 are recorded on the pilot track of the magnetic tape (track 28); these clock pulses H4 provided by the reproduction equipment 7 during the drive at low speed of the magnetic tape 10 and corresponding to the speed of transmission of the line 4. These pulses H4 are recorded on the pilot track of the magnetic tape 10 of the receiver and are read by the magnetic reading head 23d during the drive of the magnetic tape 10 at a high speed corresponding to the speed of reproduction of the equipment 7. These recorded pulses H4 constitute, when they are read at a speed greater than that of recording, pulses H'7 at a compatible rate to the rate of reproduction of the equipment 7. In the receiver, the magnetic tap 10 is furthermore associated with an electronic assembly intended to ensure the stability of the image to be reproduced by overcoming any instantaneous variation of drive speed of the magnetic tapes 10 on the emitter, side 3 or the receiver side 5. The electronic assembly and the tape 10 on the side of the receiver thus forms the buffer-memory 6.

Figure 4:
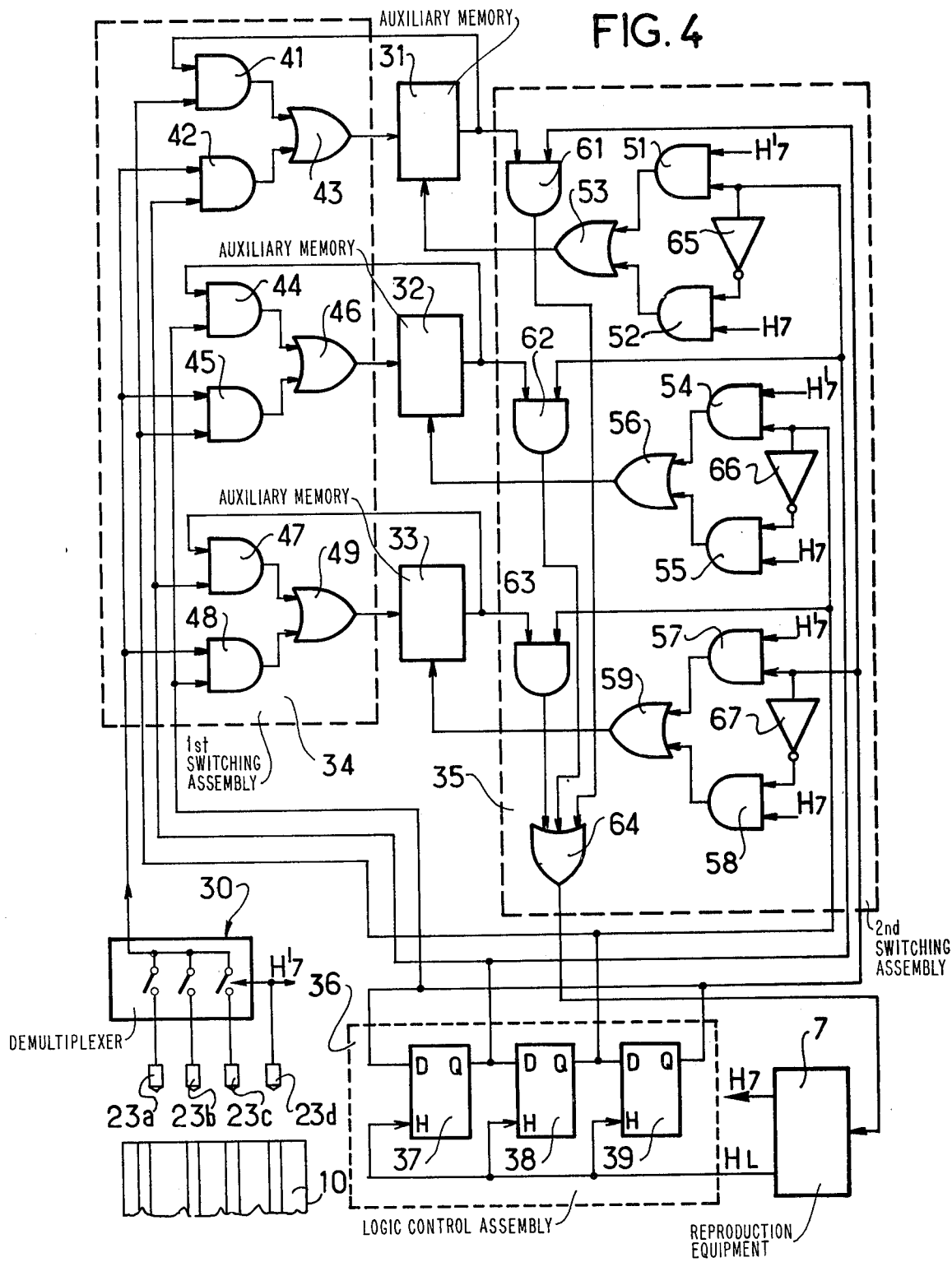
FIG. 4 shows an electronic assembly associated with the buffer-memory in the receiver equipment.

This electronic assembly is shown in FIG. 4. It is connected to the de-multiplexing circuit 30 connected to 3 magnetic reading heads 23a to 23c and controlled by the clock pulses H'7 provided by the reading head 23d associated with the pilot track on which are recorded the pulses H4. This electronic assembly comprises three auxiliary memories 31, 32 and 33 connected through a first switching assembly 34 to the output of the de-multiplexer 30 and through a second switching assembly 35 to the reproduction equipment 7 of the receiver assembly, which thus receives the transmitted coded fac-simile signals. A logic control assembly 36 is connected to the two switching assemblies 34 and 35.

Each of the auxiliary memories 31 to 33 is chosen so that it has a capacity equal to a line of the document to be reproduced by the equipment 7 (or a line on the document analysed).

The logic assembly 36 comprises three flip-flops 37, 38 and 39 for which the direct output Q of one of the flip-flops is connected to the control input D of the following flip-flop. The output Q of the flip-flop 39 is connected to the input D of the first flip-flop 37 as shown. Each of the flip-flops 37 to 39 has a clock pulse input H connected to the reproduction equipment 7 for the applying of clock pulses HL thereof at the rate of writing of the lines in the reproduction of the document, an image block being constituted at each scanning of one line of the document. Each of the outputs Q of the flip-flops 37–39 constitutes a control output for the switching assemblies 34 and 35. The first switching assembly 34 comprises, for each of the auxiliary memories 31, 32 or 33, two logic AND gates having their output connected to a logic OR gate itself connected to the input of the corresponding auxiliary memory. One of these AND gates serves as an input control gate and the other as a looping control gate. These gates are referenced 41 to 43 for the auxiliary memory 31. They are referenced 44 to 46 for the auxiliary memory 32 and 47 to 49 for the auxiliary memory 33.

The second switching assembly 35 also comprises two logic AND gates associated with each of the auxiliary memories 31, 32 or 33 and having their outputs connected to the two inputs of a logic OR gate. These logic gates serve as clock selection gates and are referenced 51 to 53 for the auxiliary memory 31, 54 to 56 for the auxiliary memory 32, and 57 to 59 for the auxiliary memory 33. Each output of the OR gates 53, 56 and 59 constitutes the control clock for shifting or advancing data in the memories 31 to 33 respectively. The second logic switching assembly 35 comprises furthermore three output control logic AND gates 61 to 63 each having one input connected to the output of a respective one of the auxiliary memories 31 to 33 and having their outputs connected in common to a logic OR gate 64. In the second switching assembly 35 one of the AND gates of the pairs of AND gates 51–52, 54–55 or 57–58 has a first input to which is supplied with the clock pulse H'7 taken from the pilot track of the tape by the magnetic reading head 23d; the other AND gate of each of the pairs of gates receives on a first input the clock pulse referenced H7 provided by the reproduction equipment 7 and indicating the writing rate of successive points of the reproduced document. The second inputs of each of the pairs of AND gates are connected together by a respective inverter 65, 66 or 67; the AND gates 51, 54 and 57 of these pairs receive on their second inputs respective ones of the three output signals of the control assembly 36.

In this second switching assembly 35, different ones of the three output signals of the control circuit 36 are also connected to the second inputs of the output control AND gates 61 to 63, so that in each assembly of logic gates associated with the three memories 31 to 33 respectively, the three output signals of the control assembly 36 are combined two by two with the third output signal absent.

In the first switching assembly 34 one of the AND gates, either 42, 45 or 48, of each of the pairs of AND gates 41–42, 44–45, 57–48, serves as the loading input and receives the coded facsimile signal provided by the de-multiplexer 30. Each of these AND gates 42, 45, 48 also receives on its second input that one of the output signals provided by the control assembly 36 and which is also applied to the corresponding clock selection AND gate 51 or 54 or 57 (switching assembly 35) associated with the same auxiliary memory 31 or 32 or 33. In the switching assembly 34, the other AND gate, either 41 or 44 or 47 of each of the pairs, serves as the loading input and has a first input connected to the output of its corresponding auxiliary memory 31 or 32 or 33. The second input of each of these AND gates 41, 44 or 47 receives the remaining one of the output signals of the control circuit 36, i.e. the one which is absent from the control inputs of the other gates in the group of gates controlling the same memory.

The operation of this electronic assembly is as follows:

In a first line period HL (first reproduction line of the document by the equipment 7), the AND gate 42 is open for the de-multiplex facsimile signal coming from 30, by the output Q of the flip-flop 37 having a logic level 1. The AND gate 41 is blocked. The coded facsimile signal is recorded in the auxiliary memory 31. This auxiliary memory receives, as advancing clock pulses for the received bits, the clock pulses H"7 coming via the clock selection AND gate 51 and the OR gate 53, the other clock selection AND gate 52 being closed by the output of the flip-flop 37 at level 1 as seen through the inverter 65.

At a second line period HL (second line of reproduction of the document) in accordance with the sequence of gates similar to the above, the auxiliary memory 32 is in the write mode under the action of the output signal Q of the flip-flop 38. The auxiliary memory 32 records the bits of the second line to be reproduced at the rate of the clock pulses H"7 recorded on the pilot track of the tape 10.

During a third line period HL (third line of reproduction of the document) the output signal Q of the flip-flop 39 puts the auxiliary memory 33 into the write mode. This auxiliary memory 33 receives the facsimile signal bits for the third line to be reproduced, at the rate of the clock pulses H"7 provided by the pilot track of the tape 10.

These three line periods HL correspond to the writing operation carried out in the memories 31 to 33, successively and cylindrically at the tape derived rate H"7.

This writing operation at the rate H"7 allows rapid fluctuation in the speed of drive of the magnetic tapes to be corrected.

Simultaneously with the writing in the auxiliary memory 31, during the first line period HL, the auxiliary memory 33 is put into re-circulation by the AND gate 47 which is open (signal Q of the flip-flop 37 at level 1). The corresponding input AND gate 48 is blocked. The rate of recirculation of the bits of this memory 33 is provided by the OR gate 59 and the open AND gate 58, the inverter 67 thus receiving the signal Q of the flip-flop 39 at level 0. The other clock selection AND gate 57 is thus closed. The data thus circulates in the auxiliary memory 33 at the rate H7 of the writing clock pulses of the successive points of a line of the document. In a similar manner, during the second line period HL, the output Q of the flip-flop 38 is at the level 1. The AND gate 41 which is open puts the bits of the auxiliary memory 31 into recirculation, the AND gate 52 being open gives a recirculation rate H7. During the third line period HL, it is the data present in the memory 32 which is put into recirculation (looping-control AND gate 44 open) at the rate H7 provided via the open AND gate 55 and the OR gate 56. This operation of putting recorded data into recirculation in the memories 31 to 33 respectively during three successive line periods HL ensures the putting in phase of the data with the writing clock pulses H7 in the equipment 7. This operation is repeated cyclically for the three memories 31 to 33. It allows a slow drift in the drive speed of the magnetic tapes to be corrected.

Furthermore, during the first line period HL, the output AND gate 62 is opened by the signal Q of the flip-flop 37. The auxiliary memory 32 is thus in the reading mode. The rate of reading is controlled by the clock pulses H7 from the open AND gate 55 and the OR gate 56. During the second line period HL, the output AND gate 63 puts the auxiliary memory 33 into the read mode at the rate H7 provided by the open AND gate 58. During the third line period HL the auxiliary memory 31 is put into the read mode at the rate H7 provided by the open AND gate 52. The reading of the memories 31 to 33 is carried out one after the other, this operation being repeated cyclically. During the reading operation, the bits from one of the memories are in phase with the clock pulses H7 and are thus transmitted to the reproduction equipment 7.

In the equipment according to FIG. 4, the three auxiliary memories 31 to 33 respectively ensure cyclically the three following operations:
— the writing of a line of the document at the rate H"7 obtained from the clock pulses H4 recorded on the magnetic tape 10,
— the putting in phase of the recorded data, by recirculation of this data at the rate H7 of the writing clock pulses of successive points by the reproduction equipment 7,
— the reading of data which has been put in phase, at the rate H7 of the writing clock pulses of the reproduction equipment 7.

This equipment in FIG. 4 allows the instantaneous fluctuations in drive speed of the magnetic tapes to be compensated as well as the drift of the produced image, while at the same time adopting a simple and economical arrangement of drive means for the tapes.

It is obvious that the auxiliary memories 31 to 33, constituted by shift registers, could alternatively be constituted by random access memories each associated with an address counter for the bits read on the magnetic tape or put in recirculation or the bits read in the memory.

Figure 5:
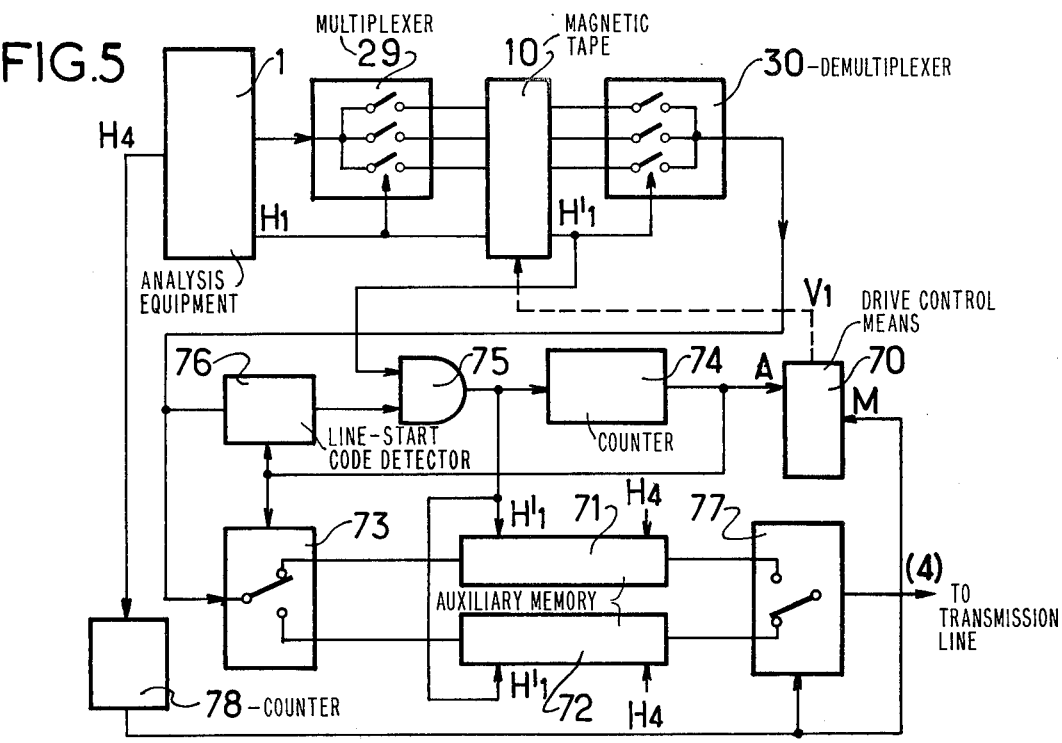
FIGS. 5 and 6 show two embodiments of respective memories for addition to FIG. 1 in intermittent start-stop operation.
Figure 6:
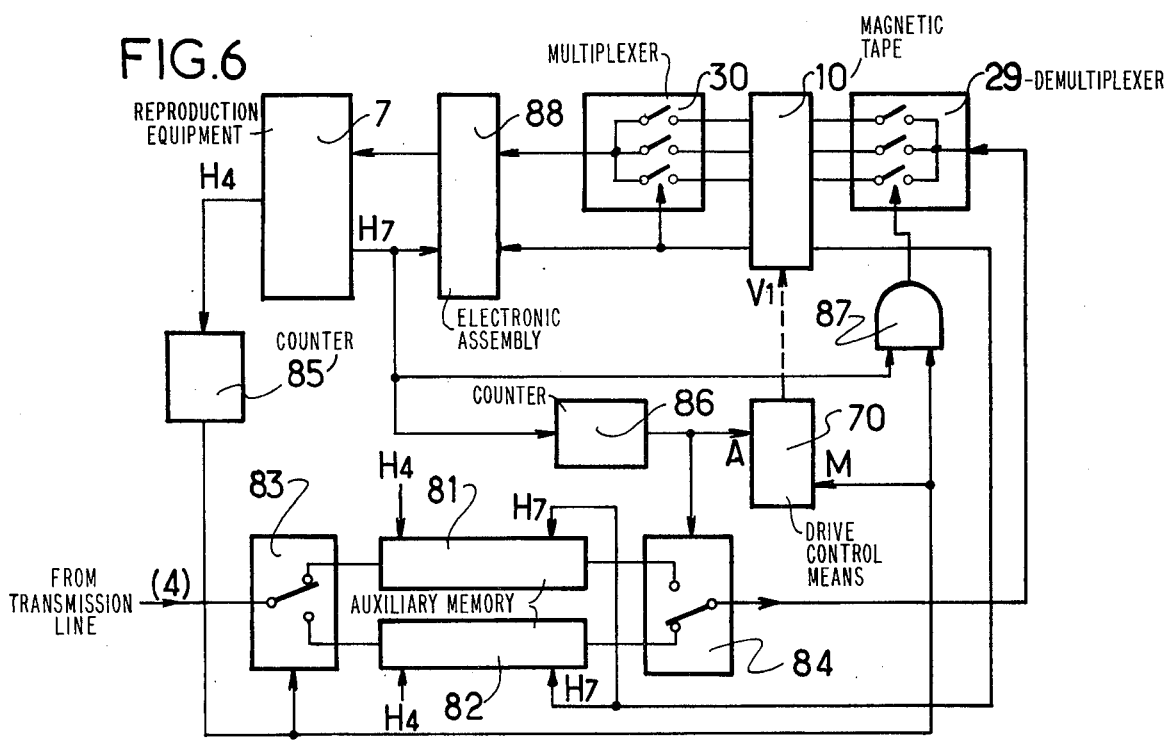

In FIGS. 5 and 6, two variants of execution of the buffer-memories 2 and 6 respectively in FIG. 1 are shown. These memories 2 and 6 each use a magnetic tape 10 such as that shown in FIGS. 2 and 3. Each of these magnetic tapes is driven at a single high speed V1, (one of the capstans 16 and pinch-wheels 17 associated therewith are eliminated, in FIG. 2). The variation of speed between the recording and the output of the data is produced by stopping the magnetic tape 10 and waiting for a new start signal for the drive motor of the magnetic tape 10.

FIG. 5, shows an embodiment of the memory at the transmitting end, that is to say the memory 2 in FIG. 1, connected to the analysis equipment 1 providing the coded facsimile signal. The coded facsimile signal is transferred from the equipment 1 to the magnetic tape 10 through the multiplexer 29 controlled by the fast clock pulses H1 giving the rate of point by point analysis in the equipment 1. The coded fac-simile signal is thus recorded on the multi-track magnetic tape 10, the clock pulses H1 being also recorded on the pilot track (FIG. 3). The complete image of the document being recorded on the magnetic tape 10, the tape 10 is read with a view to the transmission of the coded facsimile signal over the line, after de-multiplexing of the signals recorded on the tape. The de-multiplexer 30 has been shown distinct from the multiplexer member 29, with a view to explain more clearly the operation of the resulting buffer-memory; in practice a same device fulfils both the functions of multiplexing and de-multiplexing.

In this embodiment the reading of the magnetic tape 10 is carried out by the drive of the tape at high speed preceding the recording but with intermittent stopping of the drive of the tape. A control circuit for this intermittent drive is shown at 70. The means allowing the transmission of the facsimile signal from the tape 10 to the line 4 comprise a matching circuit comprising two auxiliary transfer memories 71 and 72, each having a capacity equal to one line of the document, one memory operating in the loading mode from the tape 10 at the rate H'1 of the clock pulses read from the pilot track, while the other unloads to the line 4 at the speed H4 the line 4 and vice versa. To this effect, a first switching member 73 receiving the coded facsimile signal from the de-multiplexer 30 is connected to the input of the memories 71 and 72. This switching member 73 is drawn diagrammatically as a switching device with two positions. It is switched alternately to one or other of the two positions by a signal emitted by a counter 74 having a chosen capacity equal to the number of bits contained in a line of the analysed document. This counter 74 provides a signal each time it fills up. It receives at its input the clock pulses H'1, read from the tape 10 which are applied to it through an AND gate 75. The AND gate 75 receives, in addition to clock pulses H'1, a signal for recognising the code of the start of the line of analysed document provided by a member 76. This recognition signal for the start of the line is initially provided by the analysis equipment 1, at each beginning of the analysed line, and it is coded with the fac-simile signal and recorded on the magnetic tape 10 from where it is reconstituted. The member 76 can for example be constituted by a line-start code detector, the output of the detector 76 being set at logic level 1 by the line-start code and reset at logic level 0 by the passing of the counter 74 to its full capacity.

The counter 74 thus allows the state of loading of the auxiliary memory being loaded (for e.g. 71) to be known. When the memory 71 being loaded is full, the counter provides a control signal for switching the output of the de-multiplexer 30 on the other memory 72 and provides a stop signal A to the control circuit 70 for the drive of the tape.

While the memory 71 operates in the loading mode at the speed of the pulses H'1, the other memory 72 is being unloaded at the speed H4. A second switching member 77, drawn diagramatically by a switch having two positions connects the two memories 71 and 72 to the transmission line 4. This switching member 77 is put in one or other of its two positions by the signal provided by a second counter 78 each time it fills up, its capacity being chosen to be equal to the number of bits per line of the document. This counter 78 receives the pulses H4 drawn from the analysis equipment 1 and at the rate of transmission of the line 4. The counter 78 allows the end of the transfer of the contents of the memory 72 to the line 4 to be detected. When the memory 72 is empty, the counter 78 provides the switching of the full memory 71 on the transmission line 4. The rate H'1 of loading of a memory being greater than the rate H4 of unloading of the memory, as soon as one of the memories is full the tape 10 is stopped (signal A), but as soon as the other memory is empty the tape 10 is again driven (signal M). Simultaneously with the starting of the drive of the tape 10 the operation of the memories 71 and 72 is switched, the beginning of a line of the document and the process of transferring the data from the tape 10 is repeated alternately through the two memories 71 and 72.

FIG. 6 shows an embodiment of the buffer-memory at the receiving end, that is to say the memory 6 in FIG. 1, connected to the transmission line 4 and applying the coded facsimile signal received to the reproduction equipment 7 the document.

The information transmitted over the line 4 is received in an input matching circuit associated with the magnetic tape 10. This matching circuit comprises two auxiliary transfer memories 81 and 82 connected to the line 4 by means of a first switching member 83. These two memories 81 and 82 operate alternately in the load and unload mode. The two memories 81 and 82 are connected alternately, for their unloading, to the multiplexer 29 through a second switching member 84. Thus as shown, the loading of the memories 81 and 82 is carried out at the rate of the pulses H4 provided by the reproduction equipment and corresponding to the rate of transmission of the line 4. The unloading of the memories 81 and 82 is carried out at the faster speed H7 of reproduction provided by the equipment 7. Each of the memories 81 and 82 has a capacity chosen to be equal to that of a line of the document.

The switching member 83, shown diagrammatically as a switch with two positions, is switched each time a counter 85 is filled, the counter 85, having a capacity chosen to be equal to the useful capacity of a line of the document (number of points per line, with the margins not counted). This counter 85 receives the clock pulses H4 at the rate corresponding to that of the line 4.

The switching member 84, drawn diagrammatically as a switch with two positions, is switched each time a second counter 86 is filled, the counter 86 having a capacity chosen to be equal to the total capacity of a line of the document (number of points per line, the margin being counted). This counter 86 receives the pulses H7 at the high rate corresponding to the rate of reproduction of the equipment.

The counter 85 controlling the alternate loading of the memories 81 to 82 through the switching device 83, also provides, each time it is filled, a signal M for starting a control drive circuit for the tape 10, also shown as 70.

The counter 86 controls the unloading of the memories 81 and 82, through a switching device 84, also provides at each passage through its full capacity a control signal A for stopping the drive means 70 of the magnetic tape 10.

Thus during operation, when the memory 81 is loaded at the rate H4, from the transmission line 4, the tape is driven rapidly the memory 82 is unloaded and the coded data from the memory 82 is multiplexed at 29 to be recorded on the magnetic tape 10. The multiplexer 29 is controlled by the clock pulses H7 of the reproduction equipment 7, which are applied through an AND gate 87 controlled by the signal M for driving the tape 10. These clock pulses H7 provided by the AND gate 87 are also recorded on the pilot track of the tape 10. When the memory 82 is empty, the counter 86 continues to count (number of points defining its margin). When the counter 86 has reached its full counting capacity, the magnetic tape 10 is stopped by the signal A. The operation of transfer of the fac-simile signal from the transmission line 4 to the magnetic tape 10 is repeated, the operation of the memories 81 and 82 being switched after each line of the document. Thus, the data transmitted over the line 4 is loaded into one of the memories (82), the other memory (81) being unloaded at high speed and causing the stopping of the tape 10 until the filling of the memory (82). At this moment the tape 10 is again driven, the memory (82) is unloaded, and the memory (81) is loaded. Of course the unloading of the memory, for example 82, onto the tape 10 is carried out at the rate H7 of the clock pulses provided by the AND gate 87 when the band is driven (signal M present). The image is thus totally transferred onto the magnetic tape 10, including the number of points defining the margin.

The coded facsimile signal recorded on the tape is then applied to the equipment 7 through an electronic assembly 88 for putting in phase the image as described in FIG. 4.

What we claim is:

1. An apparatus for the transmission of facsimile comprising a transmitter assembly providing a signal of binary data to be transmitted over a distance, a receiver assembly providing an image from a signal of binary control data and a transmission line between the assemblies, the apparatus comprising, in the transmitter and receiver assemblies respectively, a first and second buffer-memory using a multi-track recording tape for matching the rates of the binary data signal to be transmitted and the binary data control signal to the rate of transmission of the line, and comprising furthermore, in said second buffer-memory, a compensation device for the fluctuations of drive speed of the tape, said compensation device comprising means for recording clock pulses provided by the receiver assembly on one track of the tape, called pilot track, at the rate of recording of data on the tape, three auxiliary memories for memorizing data corresponding to an image block or image line, switching assemblies connected to respective inputs of the auxiliary memories, and a control circuit for the switching assemblies for defining from the rate of producing an image block in the receiver assembly a cyclic operation of each of the auxiliary memories successively in a write mode at the rate of clock pulses read on the pilot track for memorizing of the data read on the tape, in a recirculation mode at the rate of clock pulses of production of successive points of the image for the putting in phase of the recorded data, and in a read mode at the rate of the clock pulses of production of successive points of the image for the control of the production of this image, one of the auxiliary memories operating in the write mode while a second operates in the recirculation mode and while the third operates in the read mode.

2. An apparatus as claimed in claim 1 wherein the magnetic recording tape of each buffer-memory is a magnetic tape forming a loop in a cassette.

3. An apparatus as claimed in claim 1 wherein the recording tape of at least one of the buffer-memories is driven at two different speeds having a ratio equal to the ratio of the rate of produced or control data to the rate of transmission of the line, respectively by two separate drive capstans.

4. An apparatus as claimed in claim 1 wherein the recording tape of at least one of the buffer-memories is driven in an intermittent manner at a speed greater than the speed of transmission of the line and is associated with two transfer memories mounted between the transmission line and the tape and loading alternately from the transmission line at the transmission line speed and unloading alternately and intermittently into the buffer-memory at the said greater speed.

5. An apparatus as claimed in claim 4, wherein the receiver assembly comprises control means for driving the tape at the end of the loading of one transfer memory, and for stopping the tape at the end of the unloading of the other transfer memory the control means comprising two counters of which one receives clock pulses at the rate of transmission of the line so as to ensure the tape is driven each time said one counter reaches its full capacity which is chosen to be equal to that of the transfer memory, and of which the other counter receives clock pulses at a rate of control data operative in the receiver assembly to ensure the tape is stopped each time said other counter reaches its full capacity which is chosed to be equal to that of the said transfer memories.

6. An apparatus as claimed in claim 4 wherein the transmitter assembly comprises control means for driving the tape at the end of the unloading of one transfer memory and for stopping the tape at the end of loading the other transfer memory, the control means comprising two counters of which one receives clock pulses previously recorded on the tape simultaneously with the data signal, and read from the tape to ensure the stopping of the tape each time said one counter reaches its full capacity, and of which the other counter receives clock pulses at the rate of transmission of the line so as to ensure the tape is driven each time said other counter reaches its full capacity, the capacity of each of the counters being chosen equal to that of the transfer memories.

7. An apparatus as claimed in claim 1 wherein the recording tape comprises several magnetic tracks for recording the data signal and which comprises a multiplexer-de-multiplexer connected to the magnetic writing heads and reading head associated with said tracks for multiplexing the signal during recording and de-multiplexing the signal during reading of the tape.

* * * * *